US012736695B2

(12) United States Patent
Kalashnikova et al.

(10) Patent No.: US 12,736,695 B2
(45) Date of Patent: Sep. 15, 2026

(54) METHOD OF SEISMIC INVERSION USING ARTIFICIAL KINEMATIC CONSTRAINTS

(71) Applicants: PRE STACK SOLUTIONS-GEO AS, Oslo (NO); Vita Kalashnikova, Oslo (NO)

(72) Inventors: Vita Kalashnikova, Oslo (NO); Rune Överås, Oslo (NO)

(73) Assignee: VITA KALASHNIKOVA, PRE STACK SOLUTIONS-GEO AS, Oslo (NO)

( * ) Notice: Subject to any disclaimer, the term of this patent is extended or adjusted under 35 U.S.C. 154(b) by 369 days.

(21) Appl. No.: 18/275,303

(22) PCT Filed: Feb. 2, 2022

(86) PCT No.: PCT/NO2022/050029
§ 371 (c)(1),
(2) Date: Aug. 1, 2023

(87) PCT Pub. No.: WO2022/169370
PCT Pub. Date: Aug. 11, 2022

(65) Prior Publication Data
US 2024/0125957 A1 Apr. 18, 2024

(30) Foreign Application Priority Data
Feb. 3, 2021 (NO) .................................... 20210133

(51) Int. Cl.
*G01V 1/28* (2006.01)
*G01V 1/30* (2006.01)

(52) U.S. Cl.
CPC .............. *G01V 1/282* (2013.01); *G01V 1/303* (2013.01); *G01V 2210/512* (2013.01); *G01V 2210/514* (2013.01); *G01V 2210/614* (2013.01)

(58) Field of Classification Search
CPC . G01V 1/282; G01V 1/28; G01V 1/00; G01V 1/303; G01V 1/30; G01V 2210/512;
(Continued)

(56) References Cited

U.S. PATENT DOCUMENTS 8,792,303 B2 7/2014 Downton
11,372,124 B2 * 6/2022 Zhang .................... G06F 17/18
(Continued)

FOREIGN PATENT DOCUMENTS

WO 2011112932 9/2011
WO 2020086238 4/2020

OTHER PUBLICATIONS

International Search Report Issued in PCT/NO2022/050029, Mar. 31, 2022, pp. 1-3.
(Continued)

*Primary Examiner* — Mohamed Charioui
(74) *Attorney, Agent, or Firm* — Jeffrey S. Melcher; Melcher Patent Law PLLC

(57) ABSTRACT

The present invention relates to geophysics, and more particularly processing of seismic data for analysis and interpretation. A computer implemented method for extracting or estimating rock properties from seismic traces is disclosed. This method assists in understanding the interpretation of post-stack and pre-stack seismic data by predicting density and velocity. The computer implemented method comprising the follow steps: (1) preparing an initial model with initial functions of velocity and density and synthetic traces; (2) generating synthetic traces from the velocity and density functions with added artificial kinematic constraints; (3) creating updated synthetic traces using randomly updated velocity and density functions; for each iteration, artificial waves traveling from a source point to a reflection point and back are simulated as constraint; (4) performing a search of
(Continued)

the misfit object function of any norm, and (5) using probabilistic techniques for approximating the global optimum and minimizing the cost function.

10 Claims, 2 Drawing Sheets

(58) Field of Classification Search
CPC ....... G01V 2210/514; G01V 2210/614; G01V 2210/622; G01V 1/306; G01V 2210/6222; G01V 2210/6224; G01V 2210/67; G01V 2210/679
See application file for complete search history.

(56) References Cited

U.S. PATENT DOCUMENTS

2017/0176613 A1* 6/2017 Burnett .................. G01V 11/00
2020/0132873 A1 4/2020 Wang
2021/0041589 A1* 2/2021 Zhao ...................... G01V 1/282

OTHER PUBLICATIONS

Written Opinion Issued in PCT/NO2022/050029, Mar. 31, 2022, pp. 1-4.

* cited by examiner

[Fig. 1]

METHOD OF SEISMIC INVERSION USING ARTIFICIAL KINEMATIC CONSTRAINTS

TECHNICAL FIELD

The present invention relates to geophysics, and more particularly seismic prospecting or detecting and processing of seismic data for analysis and interpretation.

BACKGROUND ART

In geophysical exploration, seismic data is used to image the subsurface where geological and civil structures might be identified, including minerals, hydrocarbons, and other fluids. In seismic exploration, one or more sources emit elastic waves in the form of modulation of pressure or ground motion. They propagate from specific locations (wavefield) that can be on or below the surface or sea surface, or in a borehole. The wavefield propagates away from the source(s) through the subsurface. Properties of the rocks can be estimated from the wavefield response of the media contrast (such as acoustic impedance). The response can be detected/recorded at the surface, borehole or other receiver locations through the reflected wavefield as pressure, partial motion or some derivative quantities.

There is no known solution for rock properties estimation from seismic trace at normal incident wavefield response—stacked seismic data (post-stack) or seismic trace that is generated or obtained by having source and receiver at the same position—that would allow to estimate independently velocity and density properties of rocks. Known solutions are the seismic inversion algorithms or methods for normal incident wavefield response. These methods and algorithms allow inverting or estimating velocity and density functions as a product of the two functions and is normally called acoustic impedance or p-impedance.

Other existing inversion solutions allow to get velocity and density performing an inversion of only seismic offset traces or angle traces also called as seismic gather (pre-stack data) resolving for angle dependent reflectivity or velocity and density of linearized approximations. There are two main types of pre-stack inversion, deterministic and stochastic. It is usually set as least squares problem that can be described as model parameters=generalized inverse×observations. Deterministic inversion tries to achieve production of a single "best" solution. The stochastic inversion produces many possible good solutions that are average to the deterministic solution. Density is resolved poorly because it is linked to impedance and solutions assumed that the seismic offset is long enough to reach 45 degrees angle between sours and receiver from a reflected point—often is not available due to seismic data acquisition or seismic data processing issues.

For example, the latest, most accurate seismic inversion algorithms that are used in the industry worldwide, is a Bayesian-based inversion. (Reference: Buland A. and H. Omre Bayesian linearized AVO inversion. Geophysics, 2003. 63 (1)). However, it is stated in the article, that density is not reliable: «With realistic noise levels, acoustic impedance was the best determined parameter, while the inversion provided practically no information about the density." The major seismic inversion software providers supply deterministic, stochastic approaches, or approaches with Bayesian-based extension where density is linked to impedance, and it can only be resolved when inverting pre-stack seismic data.

U.S. Pat. No. 10,067,264B2 by Blanchard et al. disclose a method a seismic inversion for petrophysical properties of a subsurface volume comprising the steps of: obtaining petrophysical data relating to valid geological and/or dynamical scenarios, converting this data into valid combinations of elastic parameters; projecting the valid combinations of elastic parameters onto a spherical plot; and determining a penalty term from the distances between each cell of the spherical plot and the nearest valid combination of elastic parameters within the subsurface volume. Valid geological and/or dynamical scenarios comprise those which are petrophysically possible. The penalty term is then used to constrain an inversion minimizing a cost function associated with seismic mismatch between two or more seismic surveys. This method is limited to pre-stack data.

Further, US Application published nr. US20170108602A1 by Di Yang discloses a Full Wavefield Inversion (FWI) method to estimate subsurface properties. The Full Wavefield Inversion (FWI) requires seismic data (traces) recorded at the different angles and uses a mathematical approach (a Fourier transform, discrete Fourier transform, or a fast Fourier transform) through misfit function. According to this method only P-wave velocity (Vp) can be estimated. Further this method of relies on obtaining a seismic dataset that is separated into subsets according to predetermined subsurface reflection angle ranges and inverting for density models. Where each of the data subsets generated, acoustic FWI is applied to obtain acoustic impedances. All inversions can start from the same velocity model, and the kinematics are not updated in this process.

It is vital to evaluate rock properties such as velocity and density to explore for mineral resources. Rock properties are estimated, for example, through acquiring seismic data, with further processing and inversion. Accordingly, there is need for a method that can estimate reliably velocity (Vp) and (Dn) separately from post-stack data as well as to being able to reliably compute non-coupled density for pre-stack data.

BRIEF SUMMARY OF INVENTION

A computer implemented method for extracting or estimating rock properties from seismic traces is disclosed. This method assists in understanding the interpretation of post-stack and pre-stack seismic data by predicting density and velocity from subsurface seismic data.

The computer implemented method comprising the follow steps: (1) preparing and initial model with initial functions of velocity and density and synthetic trace(s) through (any of or a combination) acquiring, cleaning noise, computing, constructing and computing synthetic trace by any available method. (2) generating synthetic trace(s) from the velocity and density function(s) and with added artificial kinematic constraints and randomly updating the initial functions of velocity and density in random start and length time or deep window(s); (3) creating updated synthetic traces using randomly updated velocity and density functions; for each itineration, artificial wave(s) traveling from a source point to a reflection point and back to any receiver are simulated as a constraint; (4) performing a search of the misfit object function of any norm between original or real traces and the synthetic trace(s) generated in the following itineration, and (5) using probabilistic techniques for approximating the global optimum and minimizing the cost function associated with seismic trace(s) mismatch.

Furthermore, a computer program is disclosed comprising instructions which, when the program is executed by a computer, cause the computer to carry out the steps of the computer implemented method.

DETAILED DESCRIPTION OF THE INVENTION

Figure 1:
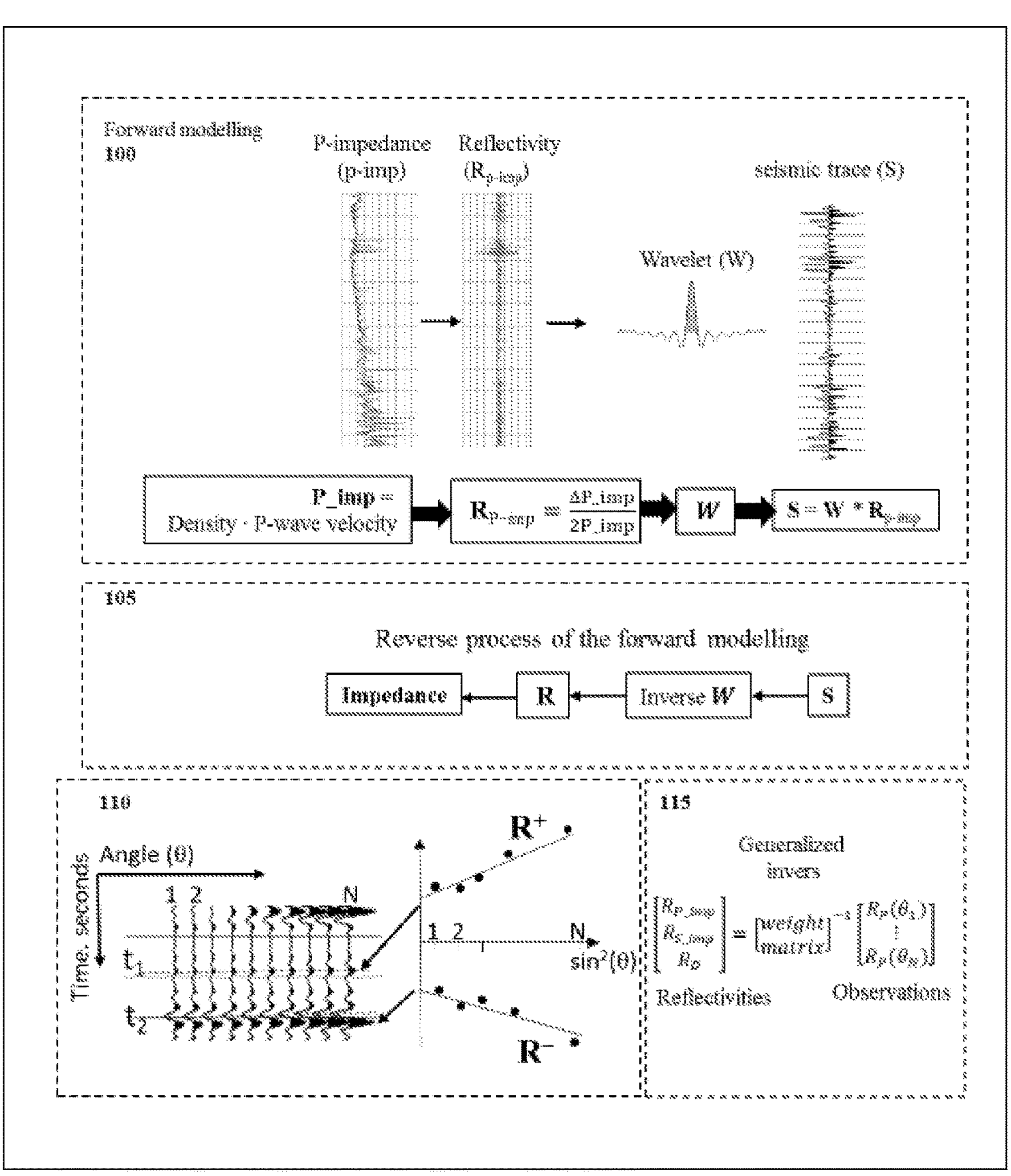
FIG. 1 Outline of existing seismic post-stack and pre-stack inversion principal.

The method and its different embodiments will be described in detail referring to the enclosed figures.

In the case of post-stack seismic data or seismic trace(s) at zero-incident (real trace): simulating offset seismic traces iteratively using artificial kinematic constraints and random updates of the velocity and density functions and searching for an optimal misfit function (when some optimal minimum is reached) between simulated traces (gather) and the real trace, accepting the simulated parameters of density and velocity. In the case of pre-stack seismic data or gathers (real traces): perform the same steps as for post-stack, with the exception that the optimal misfit function is searched between artificial offset trace(s) and the real offset/or angle trace(s). The new invention method allows inverting seismic stacked data or seismic trace of a zero-incident (post-stack) for velocity, density and impedances. Before this method, inversion on stacked data was able to resolve only impedance, where impedance is velocity multiplied by density. This method is also applicable for seismic pre-stack data. Seismic pre-stack data is a gather that collects several traces and shares some common geometric attribute: common source or receiver, midpoint, image point, offset, azimuth, angle, dipping reflector gathers. Applying algorithm to the seismic pre-stack data allows increasing quality on resulting velocity, density and impedance.

There are no known solutions for estimating Vp and Dn separately from post-stack data, in other words, with all known physics it is not possible to solve this problem. The solution achieved here does not use the "classic" physics as we get used to understanding for a plane wave propagation and seismic inversion problem. It uses algorithms from artificial intelligence (AI) families and constructed assumption, that let us solve this problem.

[The new approach does not use any of known methods: deterministic and stochastic, or geostatistical. It does not use any linearized form of any amplitude versus offset or amplitude versus angle equations. The basis of the existing algorithm are Zoepprits, Aki-Richards (1980s) and Fatti et al. (1994) equations and theirs improved approximations or modifications. (Aki, K., and Richards. 1980. "Quantitative seismology: Theory and method." (W. H. Freeman and Co.); Aki, K., B. Chouet. 1975. "Origin of coda waves: source, attenuation, and scattering effects." (J. Geophys. Res.) 80: 3322-3342; Zoeppritz, Karl. 1991. "VIIb. Über Reflexion and Durchgang seismischer Wellen durch Unstetigkeitsflächen." (Nachrichten von der Königlichen Gesellschaft der Wissenschaften zu Göttingen, Mathematisch-physikalische Klasse) 66-84; Fatti Jan L., George C. Smith, Peter J. Vail, Peter J. Strauss, and Philip R. Levitt Detection of gas in sandstone reservoirs using AVO analysis. GEOPHYSICS. 1994. 9 (59). 362-1376).

Extension of the proposed invention or method to the non-normal incident environment allows estimate parameters: at least compressional wave velocity (Vp), density (Dn), and shear wave velocity (Vs) and their derivatives, with the difference that resulted or estimated density is estimated independently of other parameters. A coupling between velocity and density parameters can be only in some cases of initial models, for example, when initial model of density is constructed by transforming velocity model to density model using Gardner equation (Gardner, G, L Gardner & A Gregory, 1974. Formation velocity and density—the diagnostic basis for stratigraphic traps. Geophysics 39, 770-780). Thus, the proposed method allows producing a result of rock properties estimation that is more accurate, computationally efficient and does not require specific extended educational skills for an operator, which executes the algorithm on the suitable computer apparatus as it would be needed for any other seismic inversion process. Computational efficiency here means compared to, for example, FWI algorithms as the most accurate for estimating the compression velocity (Vp) of seismic waves. Using the same amount of computing resources, FWI requires raw, not processed data and can estimate only low resolution Vp, while the proposed invention estimates Vp and Density independently and of high-resolution using processed seismic data that can be as stacked or sorted to gather.

The application of the proposed invention was done for the mega grid on the Norwegian Sea (the post-stack merged public available seismic data) of about 60 sq. km where more than 300 well data available for quality check and reliability of the estimated parameters. The purchase of this data by several oil company working in the region confirms the uniqueness of the inversion. Another independent study for reliability is confirmed in First Break V.38, 2020: July "Application of post-stack Rune Inversion for reservoir rock properties estimation in comparison with conventional seismic attribute analysis: a case study from the Paleocene formation, Middle Indus basin, onshore Pakistan Muhammad Zahid Afzal Durrani, Maryam Talib, Vita Kalashnikova, Musharaf Sajjad, Rune Øverås, Carl Fredrik Gyllenhammar, Bakhtawar Sarosh and Syed Atif Rahman".

Seismic amplitudes contain information about the geological and physical properties of the rocks 100. A seismic invention is performed to extract potential properties. The mathematical methods allow inverting the seismic amplitudes to physical properties of the rocks, FIG. 1. Thus, post-stack inversion methods (model-based, recursive, sparse spike, colored) allows inverting seismic data to rock properties of only p-impedance 105; pre-stack inversion methods with the same mathematical approaches allow extending inversion of seismic data to rock properties estimation such as elastic impedance, Lame parameters, compressional-velocity (Vp), shear-velocity (s) and density (ρ) 110.

Pre-stack seismic inversion is an ill-posed problem that gives equivalent solutions for a large ensemble of rock properties. Other integrated and extended seismic inversion approaches of processes seismic data using multivariate or Bayesian statistic allow at some level to reduce the uncertainties. The parameter that is least accurately predicted is density, due to linearized dependency on impedance and sensitivity to the seismic noise.

To illustrate the basic definition of the problem formulation, the amplitudes of the seismic gather can be presented as a linearization of amplitude versus offset equation. In addition, pre-stack seismic data can be written as function of the reflectivity of acoustic impedance ($R_{P\_imp}$), shear impedance reflectivity ($R_{P\_imp}$), and density reflectivity ($R_D$):

$$R_P(\theta) = \alpha R_{P\_imp} + \beta R_{S-imp} + \gamma R_D,$$

where $$R_P = \frac{\Delta P_{-imp}}{2P_{\_imp}},\ R_{s\_imp} = \frac{\Delta S_{-imp}}{2S_{-imp}},\ P_{\_imp} = \rho V_p,\ S_{\_imp} = \rho V_s,\ R_D = \frac{\Delta\rho}{2\rho}$$

$$\alpha = 1 + \tan^2\theta,\ \beta = -8\left(\frac{V_s}{V_p}\right)\sin^2\theta, \text{ and } \gamma = 4\left(\frac{V_s}{V_p}\right)^2\sin^2\theta - \tan^2\theta.$$

The solution for the parameters can be found by inverting separately each of the extracted reflectivity components at time t and trace N 110, using least-squares inversion and post-stack type scheme 100; or simultaneously, through derivative operator 115, for example, through a least-square problem: modelled parameters=generalised inverse×observation. The solution also can be presented deterministically—single best solutions, or stochastically—many possible good solutions that are averaged to the deterministic one. Bayesian stochastic inversion approach produces reasonable results however has difficulty in converging to an answer. A benefit of stochastic inversion based on multivariate Bayesian statistics is the possibility of getting the conditional probability for the answer choice; however, even a small level of noise density solution is not reliable. Thus, existing seismic inversion approaches resolve density only as a coupled parameter and from the inverting only a pre-stack data.

Figure 2:
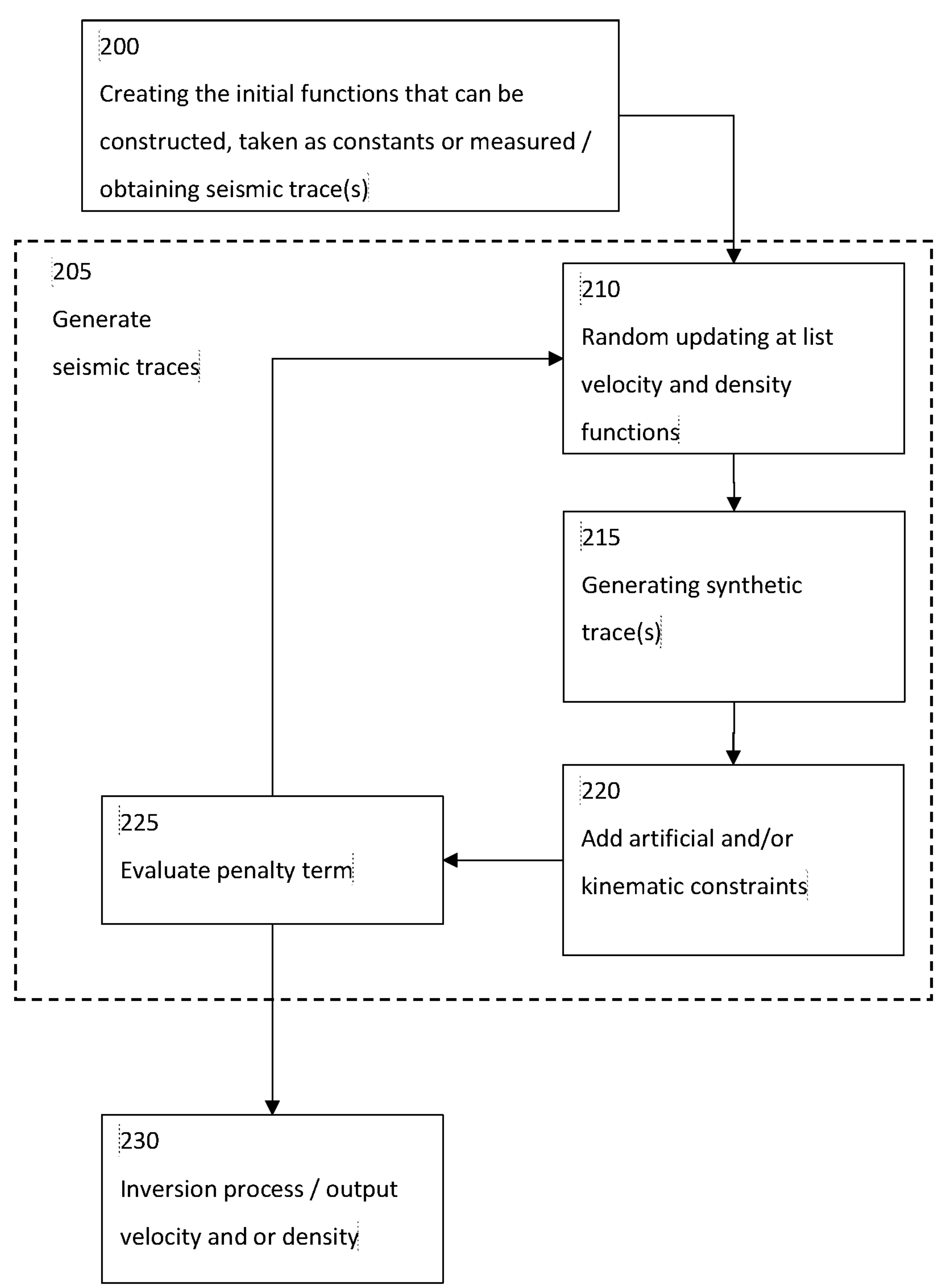
FIG. 2 Outline of computer implemented method.

FIG. 2 shows a flowchart of the preferred embodiment of the method for estimating of Vp and ρ independently (the coupling can happen only beyond the frequency on the initial model), including the approach of these parameters estimation from the post-stack seismic data.

In the first aspect of invention there is provided a method for compressional wave and density estimation at normal incident of wave field response or stacked seismic data (post-stack), or any given trace or seismic trace when seismic wave source and receiver at the same position. Here, the seismic source and receiver can be considered at nearby positions that the error when creating post-stack seismic trace from summing several traces or projecting trace(s) to the zero-incident location is acceptable.

Thus, it is necessary to generate seismic trace(s) 205 by simulating or modelling any artificial wave(s) travelling from any source point to any reflection point and back to any receiver point. It can be considered as simulating a seismic gather with any offset or angle. The travelling to destinations can be defined differently; for example, a receiver can be located at any angle from the travelling wave's reflection point; or the receiver and source can be propagated to the same position from any other offset or angle.

To create trace(s) of artificial waves, it is necessary to define initial functions of seismic velocity and density for each location of the real seismic trace—the trace or traces participating in the inversion process. The function(s) can be constructed, taken as constants or measured 200.

The generated synthetic trace(s) are used to define the penalty term 225. The synthetic trace(s) is "compared" to the real seismic trace through performing a search of the misfit object function, using probabilistic techniques for approximating the global optimum and minimizing the cost function—trace(s) mismatch. In optimization definition, a cost function is a function that maps an event or the values of one or more variables to a real number that intuitively represents some "cost" associated with the event. The optimization problem is aimed at minimizing the cost function. This can be done on the point-to-point-base, window-based of the whole trace-based. Or rather than computing minimum distance, an average distance to all valid points or to an average distance to the some or a group of nearest points can be used. When the penalty term is in compliance or the misfit function criteria is reached, the velocity and density function used in the synthetic trace(s) generating process output as found in the inversion process 230.

The generating synthetic trace(s) 215 is done iteratively 205, the first one or group of traces can be constructed from the initial functions 200 of at least velocity and density, the next synthetic trace(s) generated from the at least velocity and at least density function(s) randomly updated in random start and length time or depth window(s) and added artificial and/or kinematic constraints 220. Each generated synthetic trace or group of traces go through the penalty term 225. If penalty criteria 225 is not reached, the iteration is repeated. This is used as constraint in the inversion process for each iteration. Another option is that mismatch estimation can be associated with to the alignment offset or angle seismic traces at each or several time event (reflecting point(s)) of a seismic wave.

The update of initial functions of at least velocity and density can be random with a random start, and random length of time or depth window. The updated synthetic trace(s), created using randomly updated at least velocity and density functions, is performed for each iteration.

In another embodiment of the invention, the method is extended to non-normal incident wave field response—the offset or angle trace(s) of pre-stack seismic data (often called seismic gather). In this case, all processes showed on FIG. 2 per the first aspect is repeated. In this case, the penalty term is defined by "comparison" generated offset or angle trace(s) with the real offset or angle trace(s). The generated traces as well as per the first aspect can be the offset traces or in any way summed up group(s) of offset or angle traces. Shear wave velocity is included in the initial functions. It can be acquired or computed or constructed shear wave velocity. And, shear wave velocity is estimated as additional parameter, using the same scheme on FIG. 2.

The uniqueness of the described process is that for the first case (post-stack data), we use the process that involves velocity and density convolution to generate synthetic trace (s) and kinematic constraints that further, through the described iterative process, allows us to estimate Vp and Dn independently. The penalty term is defined by the "comparison" of the synthetic data. For the extended case (the pre-stack data), the penalty term is defined by "comparison" synthetic and real data. The difference with the existing U.S. Pat. No. 10,067,264B2 patent that is limited to only pre-stack data is 1) FWI algorithm uses a starting subsurface physical properties model and synthetic seismic data for full elastic wave modelling of the shot. The synthetic is generated by solving a wave equation using a numerical scheme (e.g., finite-difference, finite-element, etc.), where the main point is to estimate the wave travelling distance from a shot point to a receiver point; 2) An estimation process is only for compressional velocity; 3) the penalty term is used to constrain an inversion minimizing a cost function associated with a seismic mismatch between two or more seismic surveys and a list of synthetic dataset, that produced mathematically and geometrically differently, and cannot result in velocity and density estimation independently.

In another example, the method is applied to seismic pre-stack data. Seismic pre-stack data is a gather that collects several traces and share some common geometric attribute: common source or receiver, midpoint, image point, offset, azimuth, angle, dipping reflector gathers. Applying the algorithm to seismic pre-stack data, allows increasing quality on resulting velocity, density, and impedance.

The proposed invention for a post-stack case provides a quick first look and serve as an input to a more comprehensive study, with the advantages of more reliable uncoupled parameters estimation. That is a new and better work process for inversion. The extension for the pre-stack case (under velocity and density functions on FIG. 2, we understand compressional and share velocities and density) opens a new possibility for even more accurate and reliable Vp and density estimation and reliable and non-coupled Vs.

One or more steps of the methods and the concepts described herein may be embodied in the form of computer readable instructions for running on suitable computer apparatus, or in the form of a computer system comprising at least a storage means for storing program instructions embodying the concepts described herein and a processing unit for performing the instructions. Such a computer system may also comprise a display unit and one more input/output device.

The invention claimed is:

1. A computer implemented method for extracting or estimating velocity and density from seismic traces acquired from a subsurface formation comprising the following steps:

preparing an initial model with initial functions of velocity and density taken as constants or measured by obtaining seismic trace(s) by representing reflected seismic wavefields or measured by obtaining borehole logs;

generating synthetic trace(s) from the initial functions of velocity and density function(s) by forward modeling seismic wave propagation through the subsurface formation with added artificial kinematic constraints and randomly updating the initial functions of velocity and density in random start and length time or depth window(s);

creating updated synthetic traces, using randomly updated the velocity and density functions, wherein for each iteration, artificial wave(s) traveling from a source point to a reflection point and back to any receiver are simulated as a constraint to reproduce travel-time and moveout behavior of seismic events;

performing a search of a misfit object function of any norm between original or real trace or traces and the synthetic trace(s) generated in the following iteration based on comparison of amplitude and temporal alignment of seismic reflections;

using probabilistic techniques for approximating the global optimum; and minimizing the cost function associated with the seismic trace(s) mismatch to generate a subsurface model of the formation including spatially varying velocity and density.

2. The computer implemented method of claim 1, wherein the window(s) can be of fixed length and/or fixed starting point.

3. The computer implemented method of claim 1, wherein the receiver and source in the same position can be propagated from any other offset and/or angle.

4. The computer implemented method of claim 1, wherein the computer implemented method uses initial function of acquired or computed or constructed shear wave velocity.

5. The computer implemented method of claim 1, wherein simulation or modelling of any artificial waves, the offset or angle or several offsets or angles of measured or obtained traces are used.

6. The computer implemented method of claim 1, wherein a penalty term is used to limit or end the iteration, minimizing the cost function associated with the mismatch to an alignment offset or angle seismic traces at each or several time event or reflecting point(s) of a seismic wave.

7. The computer implemented method of claim 1, wherein the new poststack case is used as an initial step in a new workflow for inversion providing more accurate non-coupled Vp, Vs and density estimation.

8. The computer implemented method of claim 7, wherein the alignment offset or angle seismic traces is done for several events.

9. A non-transitory computer-readable medium encoded with instructions which, when executed by a computer, cause the computer to perform the method of claim 1.

10. A data processing system comprising a processor configured to perform the steps of the computer implemented method of:

preparing an initial model with initial functions of velocity and density taken as constants by representing reflected seismic wavefields or measured by obtaining seismic trace(s) or measured by obtaining borehole logs;

generating synthetic trace(s) from the initial functions of velocity and density function(s) by forward modeling seismic wave propagation through the subsurface formation with added artificial kinematic constraints and randomly updating the initial functions of velocity and density in random start and length time or depth window(s);

creating updated synthetic traces, using randomly updated the velocity and density functions, wherein for each iteration, artificial wave(s) traveling from a source point to a reflection point and back to any receiver are simulated as a constraint to reproduce travel-time and moveout behavior of seismic events;

performing a search of a misfit object function of any norm between original or real trace or traces and the synthetic trace(s) generated in the following iteration based on comparison of amplitude and temporal alignment of seismic reflections;

using probabilistic techniques for approximating the global optimum; and minimizing the cost function associated with the seismic trace(s) mismatch to generate a subsurface model of the formation including spatially varying velocity and density.

* * * * *